Jan. 6, 1931. G. MUFFLY 1,787,452

PISTON

Filed Sept. 20, 1928

INVENTOR
GLENN MUFFLY.
BY
Harness, Dickey & Pierce
ATTORNEYS

Patented Jan. 6, 1931

1,787,452

UNITED STATES PATENT OFFICE

GLENN MUFFLY, OF DETROIT, MICHIGAN, ASSIGNOR TO COPELAND PRODUCTS INC., A CORPORATION OF MICHIGAN

PISTON

Application filed September 20, 1928. Serial No. 307,106.

My invention is particularly directed to a piston of the type wherein a valve is located in the top thereof. Such pistons are useful particularly in refrigerating systems.

One of the primary objects is to provide a piston having a fixed top which may be brought to a close mechanical clearance with the cylinder head together with a valve positioned in the piston head which is adapted to alternately open and close as the piston is lowered and raised.

With the above and other objects in view, my invention consists in the arrangement, combination and construction of the various parts of my improved device, as described in the specification, claimed in my claims and shown in the accompanying drawings, in which:

Figure 1:
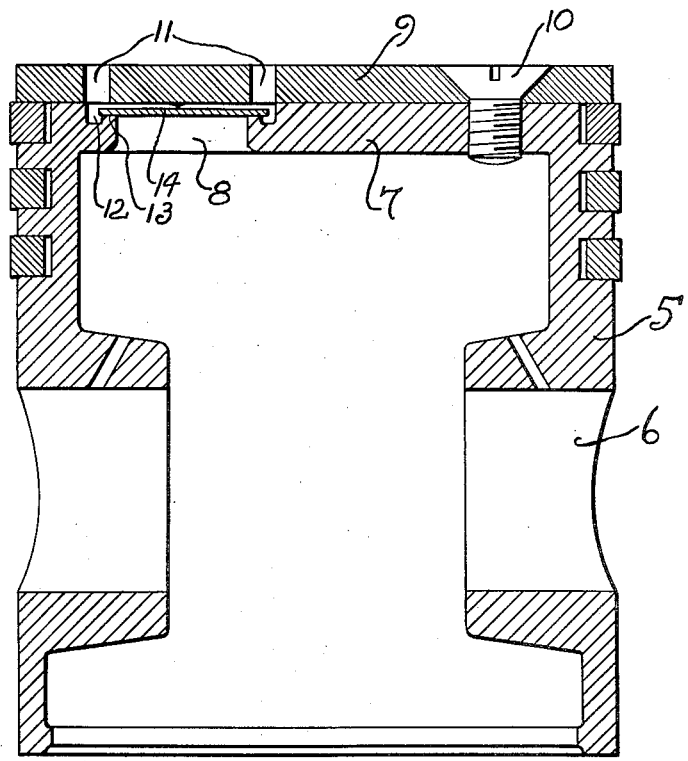
Fig. 1 is a central vertical sectional view of a piston wherein my invention is employed.
Figure 2:
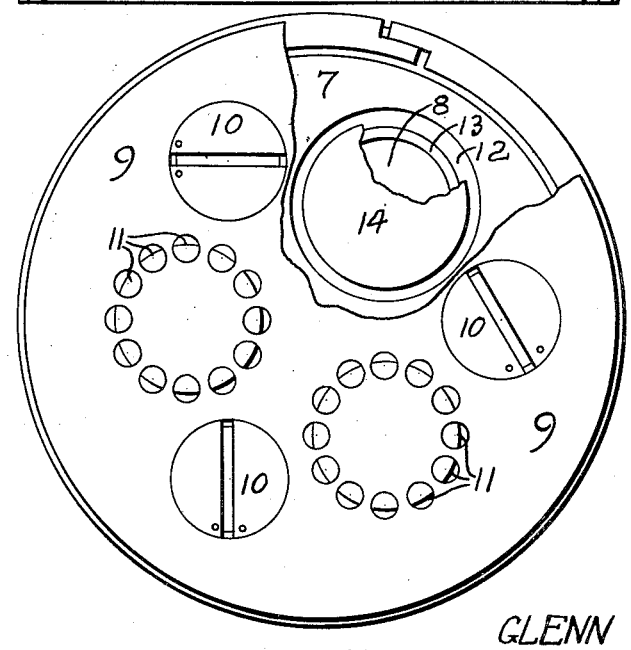
Fig. 2 is a top or plan view of the same with certain parts broken away.

I have shown a piston comprising a skirt 5, wrist pin bosses 6 and fixed head 7 having openings 8 therethrough. Secured on the head 7 is a removable head or plate 9, the securing means in this instance being a plurality of screws 10. In the removable plate 9, over each of the openings 8, is provided a series of openings 11 to permit the passage of gases or other like material which pass through the openings 8.

Around each of the openings 8 is a counter bore 12 having a bearing surface 13 on which a plate valve 14 is adapted to seat. Each of the surfaces 13 is spaced from the plate 9 a distance greater than the thickness of the corresponding valve 14 so that the valve may rise from pressures within the piston and will fall to its seat from pressures without the piston. In the first position gases or other like material may pass through the top of the piston whereas the same will be sealed in the latter position.

It will be obvious that I have provided a piston whose head is provided with a valve adapted to permit the passage of gases or other like materials therethrough or to stop the passage of the same. It will also be apparent that by virtue of the positioning of the valve within the piston head it becomes possible to drive the piston in a compressor or the like to the point where the head thereof will closely approach the head of the cylinder in which it is operating so as to secure the greatest possible compression.

It will be obvious that various changes may be made in the arrangement, combination and construction of the various parts of my improved device without departing from the spirit of my invention and it is my intention to cover by my claims such changes as may reasonably be included within the scope thereof.

What I claim is:

1. The combination of a piston having a valve duct in its head and an integral valve seat in said duct, a valve in said duct and means to retain said valve in said duct comprising a flat plate completely covering the head of said piston and secured thereto.

2. In combination with a piston having a valve duct and an integral valve seat in said duct, said piston having annular grooves, piston rings in said annular grooves, a valve in said valve duct, a plate secured to said piston having passages cooperating with said valve duct, said plate being adapted to contact said valve and one of said piston rings.

3. In combination with a piston having a valve duct and an integral valve seat in said duct, said piston having annular grooves, piston rings in said annular grooves, a valve in said valve duct, and unitary means retaining said valve and one of said piston rings comprising a plate secured to said piston.

4. A piston having a head, said head having a plurality of valve passages therethrough, said head having integral valve seats in said valve passages, said head having a recess above each of said valve seats, a valve in each of said recesses and means to retain said valves comprising a flat plate having passages cooperating with said valve passages, said flat plate completely overlying all of said recesses and secured to said head by means intermediate said recesses.

GLENN MUFFLY.